UNITED STATES PATENT OFFICE.

JOHN W. DIXON, OF PHILADELPHIA, PENNSYLVANIA.

IMPROVED PROCESS OF MAKING PULP FROM WOOD, STRAW, AND OTHER MATTERS.

Specification forming part of Letters Patent No. 55,836, dated June 26, 1866.

*To all whom it may concern:*

Be it known that I, JOHN W. DIXON, of the city of Philadelphia and State of Pennsylvania, have invented a new and useful Process of Making Pulp from Wood, Straw, and other Vegetable Matters; and I do hereby declare the following to be a full and exact description of the same.

My invention consists in boiling wood, straw, &c., after having been chipped or finely cut, in a solution of aluminate of soda under pressure, and also consists in causing a highly-heated solution of aluminate of soda under pressure to be forced to circulate through the mass of wood or straw to be pulped within a close digester.

I dissolve the aluminate of soda in the proportion of one pound of aluminate of soda to two and a half gallons of water, and I employ forty gallons of this solution to one hundred pounds of wood or straw. The wood or straw and the solution made as above are placed in a strong closed digester, and I prefer one constructed, in accordance with my Letters Patent heretofore granted, with a circulating-pump to force the liquid from the bottom to the top of the digester, or vice versa, and through the mass to be pulped.

The heat of the solution in the digester should be maintained at or about the temperature due to sixty pounds pressure, or above that. The mass should be submitted to this action from six to eight hours, depending on the temperature.

Having thus described my improvement, what I claim as my invention, and desire to secure by Letters Patent, is—

1. The pulping of wood, straw, and other vegetable substances with a solution of highly-heated aluminate of soda under pressure, substantially as described.

2. The pulping of wood, straw, and other vegetable substances by circulating a highly-heated solution of aluminate of soda through the mass to be pulped, substantially as described.

JOHN W. DIXON.

Witnesses:
J. F. HAGY,
GEO. BUCKLEY.